United States Patent Office 3,465,004
Patented Sept. 2, 1969

3,465,004
ALUMINUM CHLORIDE CATALYZED REACTION OF ALIPHATIC DIBASIC ACID ANHYDRIDES WITH HETEROCYCLIC COMPOUNDS
Jack E. Crawford, East Brunswick, Harold M. Foster, Middlesex, and Thomas W. Higgins, Piscataway Township, Middlesex County, N.J., assignors to Mobil Oil Corporation, a corporation of New York
No Drawing. Filed Sept. 3, 1964, Ser. No. 394,324
Int. Cl. C07d 63/12, 5/16, 27/22
U.S. Cl. 260—332.2    14 Claims This invention relates to the preparation of aromatic ketoaliphatic carboxylic acids. It is more particularly concerned with an improved aluminum chloride catalyzed reaction of aliphatic dibasic acid anhydrides with heterocyclic compounds.

It has been proposed to prepare aromatic ketoaliphatic carboxylic acids by reacting an aromatic compound with a dibasic acid anhydride using anhydrous aluminum chloride catalyst, in a ratio of 2 moles aluminum chloride per mole acid anhydride, and nitrobenzene solvent. Particularly in the case of active heterocyclic aromatic (acid sensitive) compounds, however, side reactions occur which adversely affect yield of desired product. Thus, when reacting succinic acid anhydride, thiophene, and anhydrous aluminum chloride in a molar proportion of 1:1:2, respectively a considerable amount of the thiophene was converted into "thiophene tar." The yield of 3-(2-thenoyl) propionic acid was in the order of between 50 and 60 percent. It will be readily appreciated that yields of such magnitude are not commercially attractive or economically feasible.

It has now been found that dibasic acid anhydrides can be reacted with active heterocyclic (acid sensitive) compounds in the presence of anhydrous aluminum chloride by a process that effects high product yields which are commercially attractive and economically feasible. It has been discovered that such high product yields are achieved by a combination of (1) pre-reacting the dibasic acid anhydride and anhydrous aluminum chloride in the absence of the heterocyclic compound and (2) using certain halogenated paraffin solvents. It is a further discovery of this invention that, contrary to the teaching of the prior art, the reaction can be carried out using less than 2 moles of anhydrous aluminum chloride per mole of dibasic acid anhydrous, pre-reacted in certain halogenated paraffin solvents.

Accordingly, it is a broad object of this invention to provide a process for preparing heterocyclic-substituted ketoaliphatic carboxylic acids. Another object is to provide an efficient process for reacting a dibasic acid anhydride with a heterocyclic compound in the presence of anhydrous aluminum chloride. A specific object is to provide a method for reacting a dibasic acid anhydride with a heterocyclic compound in the presence of anhydrous aluminum chloride that effects high product yields that are commercially attractive and economically feasible and which involves pre-reacting the anhydrous aluminum chloride and dibasic acid anhydride and the use of certain halogenated paraffic solvents. Other objects and advantages of this invention will become apparent to those skilled in the art, from the following detailed description.

In general, this invention provides a method for effecting the reaction of a dibasic acid with a heterocyclic compound, that comprises prereacting anhydrous aluminum chloride with an aliphatic dibasic acid anhydride, thereby obtaining a complex of said anhydride and anhydrous aluminum chloride; and reatcing a heterocyclic compound reactant with said complex in a solvent selected from the group consisting of dibromomethane, dichloromethane, bromochloromethane, and normally liquid halogenated paraffins that are inert to aluminum chloride and have the formula:

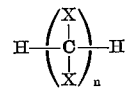

wherein $n$ is an integer from 2 to 4, X is Cl, Br, or H, the total number of halogens is from 2 to 4, and at least two carbon atoms have halogen attached thereto.

In its preferred embodiment, this invention provides a method for effecting the reaction of a dibasic acid anhydride with a heterocyclic compound, that comprises pre-reacting anhyrous aluminum chloride with a solution of an aliphatic dibasic acid anhydride in a solvent selected from the group consisting of dibromomethane, dichloromethane, bromochloromethane, and normally liquid halogenated paraffins that are inert to aluminum chloride and have the formula:

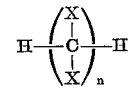

wherein $n$ is an integer from 2 to 4, X is Cl, Br, or H, the total number of halogens is from 2 to 4, and at least two carbon atoms have halogen attached thereto, thereby obtaining a complex of said anhydride and anhydrous aluminum chloride dispersed in said solvent; and reacting a heterocyclic compound reactant with said complex.

The aliphatic dibasic acid anhydride reactant utilizable in the process is the anhydride of any aliphatic dibasic acid that forms a stable cyclic anhydride. They can be saturated or unsaturated, but preferably are saturated. Depending upon specific desired end uses, as more specifically discussed hereinafter, the anhydride reactants can have substituents that will not interfere with the reaction, such as halogen, lower alkyl ($C_1$ to $C_4$), lower alkenyl ($C_2$ to $C_4$). Non-limiting examples of the aliphatic dibasic anhydride reactant are succinic acid anhydride, glutaric acid anhydride, methylsuccinic acid anhydride, dimethylsuccinic acid anhydride, butenlysuccinic acid anhydride, citraconic acid anhydride, itaconic acid anhydride, glutaconic acid anhydride, chlorosuccinic acid anhydride, maleic acid anhydride, propenylsuccinic acid anhydride, ethylgultaric acid anhydride, and propylsuccinic acid anhydride.

The solvents utilizable in the process of this invention are dibromomethane, dichloromethane, bromochloromethane, and the normally liquid halogenated paraffins containing 2 to 4 halogen atoms that are inert to aluminum chloride and have the formula:

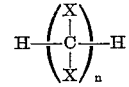

wherein $n$ is an integer from 2 to 4 and X is Cl, Br, or H and at least 2 carbon atoms have halogen attached thereto. The polyhalogenated alkanes can be prepared by methods well known in the art and many are commercially available. It is to be noted that all polyhalogenated paraffins that are encompassed by the structural formula set forth hereinbefore are not suitable solvents in the process of this invention. Two other requirements, as aforementioned, must be met. Firstly, at least two carbon atoms must have at least one halogen attached thereto. All the halogen atoms cannot be on the same carbon atom. Thus, for example, 1,1-dibromoethane is a poor solvent, whereas 1,2-dibromoethane is an excellent solvent. Secondly, the solvent must be inert to anhydrous aluminum chloride, i.e., it should not be reactive there-with. Some halogenated paraffins are known to be reactive with anhydrous aluminum chloride. In any event, the reactivity of any polyhalogenated paraffin with anhydrous aluminum chloride can be readily and easily determined by one skilled in the art, by means of a simple test. This is done by placing a small amount of anhydrous aluminum chloride in a small portion of the polyhalogenated paraffin being tested. If the halogenated paraffin is reactive, this will be evidenced by color formation and, sometimes, by visible indication of reaction, such as by frothing or by a temperature increase. Non-limiting examples of the utilizable halogenated paraffin solvents are 1,2-dibromoethane; 1-bromo-2-chloroethane; 1,2-dichloroethane; 1-bromo-2,2-dichloroethane; 1,1,2,2-tetrabromoethane; 1,1,2,2-tetrachloroethane; 1,1,2-trichloroethane; dibromomethane; dichloromethane; bromochloromethane; 1,2-dibromopropane; 1,3-dibromopropane; 1-bromo-2-chloropropane; 1,2-dichloropropane; 2,3-dichlorobutane; 2,3-dibromobutane; 1,3 - dichloro - 2,3 - dibromobutane; 1,2,3-tribromobutane; and 1,4-dibromobutane. Solvents that have been found not to be useful in the process of this invention include 1,1-dibromoethane; 1,1-dichloroethane; 1-bromo-1-chloroethane; 1,1 - dibromopropane; 2,2-dichloropropane; 1,2,3-tribromopropane; and 1,2,3-trichloropropane.

The amount of halogenated paraffin solvent used will be sufficient to substantially completely dissolve the dibasic acid anhydride reactant at moderately elevated temperature. Thus, the amount of solvent used will vary with the particular solvent and with the particular anhydride involved. This amount can be readily determined in each case by those skilled in the art. More than that amount can be used, limited only by what is commercially practical to handle. In the case of succinic acid anhydride, using a variety of solvents, it was found that between about 1800 and about 2000 milliliters of solvent per gram mole of anhydride were feasible.

As is indicated hereinbefore, the process of this invention essentially involves two phases, i.e. (1) prereacting anhydrous aluminum chloride with the dibasic acid anhydride to form a complex and, then, (2) reacting the complex with a heterocyclic compound reactant. In the preferred practice of the process, a halogenated paraffin solvent as defined hereinbefore will be used in both process stages. Surprisingly, however, it has been found that a solvent other than the aforedefined halogenated paraffins can be used in the first (prereacting) stage, provided that a halogenated paraffin solvent, as aforedefined, is used in the second stage. The solvent in the first stage need not be removed before the second stage of the reaction. Thus, the solvent in the first stage can be a defined halogenated paraffin or it can be any of the well-known solvents used in Friedel-Crafts reactions that are not reactive with anhydrous aluminum chloride. For example, when chloroform is used in both stages of the process, the yield of ketoaliphatic acid product was nil. Yet, when chloroform was used in the first stage and a defined halogenated paraffin was added to the second stage, the yield of product was high.

In the prior art processes for condensing succinic acid anhydride with thiophene, using techniques and solvents other than those of this invention, it was taught that it was necessary to use 2 moles of anhydrous aluminum chloride per mole of anhydride to ensure maximum yield. It was postulated that the first mole of anhydrous aluminum chloride split the anhydride ring to form an acyl chloride complex and that the second mole was needed to catalyze the condensation. Contrary to this teaching, when using the techniques and halogenated paraffin solvents of this invention, it was found that the full second mole of anhydrous aluminum chloride was not necessary to obtain high yields. Any amount of anhydrous aluminum chloride above one mole per mole of anhydride reactant and up to 2 moles can be used in the process of this invention. Thus, the total amount of anhydrous aluminum chloride used will be between about 1.1 moles and about 2 moles per mole of dibasic acid anhydride reactant. When less than 2 moles total of anhydrous aluminum chloride are used either of two methods can be used. The total amount of anhydrous aluminum chloride less than 2 moles can be complexed with all the anhydride reactant and then reacted with a heterocyclic compound reactant. On the other hand, it was also found that, after complexing a full 2 moles of anhydrous aluminum chloride with the anhydride and effecting condensation with heterocyclic compound reactant and after the reaction was complete, additional anhydride reactant can be added to the reaction mixture and complexed. Then, additional heterocyclic compound reactant can be added and condensed to high overall yield. In this case, although starting with 2 moles of anhydrous aluminum chloride, the total amount used per mole of anhydride reactant is less than 2 moles.

In order to prepare the aliphatic dibasic acid anhydride-aluminum chloride complex, the anhydride is first substantially dissolved in a solvent, preferably the halogenated paraffin solvent. Solution is facilitated by heating the solvent at temperatures up to the boiling point of the solvent, although temperatures up to about 70–80° C. are usually sufficient. The solution thus obtained is cooled, usually to about room temperature (about 21° C.). Temperatures above and below room temperature, however, are utilizable.

Then, the anhydrous aluminum chloride is added to the solution of anhydride. Efficient stirring or agitation and external cooling means are desirable. The reaction between the aliphatic dibasic acid anhydride and anhydrous aluminum chloride to form the complex is somewhat exothermic and takes place quickly. At this stage, however, there is no heterocyclic compound reactant present that can be attacked by anhydrous aluminum chloride. Thus, careful temperature control is not essential during the complexing operation. The complex usually forms a fine slurry in the solvent. Preferably, the mixture is stirred for a few minutes to an hour after addition of anhydrous aluminum chloride is complete. The slurry of the complex thus obtained is reacted, in a second stage operation, with a stoichiometric amount (1:1 mole) of heterocyclic compound reactant.

The heterocyclic compound reactant utilizable in the process of this invention is a 5- or 6-membered ring compound containing at least one sulfur, oxygen, or nitrogen atom in the ring. The hetero-ring can be fused with a benzene ring. The heterocyclic compound reactant can, if desired, have substituents that will not interfere with the reaction, such as halogen and lower alkyl ($C_1$ to $C_4$). The method of this invention is particularly effective with regard to acid-sensitive heterocyclic compound reactants. "Acid-sensitive" heterocyclic compounds are those which undergo degradative side reactions (e.g. polymerization) in the presence of strong acidic materials, such as mineral acids and anhydrous aluminum chloride. Thus, thiophene and furan are polymerized by acids to form oily or tarry products which decreases yield of desired product in prior art processes. Examples of the heterocyclic compound reactants are thiophene; 2-bromothiophene; 2-chlorothiophene; 2,3-dimethylthiophene; 2,4-dimethylthiophene; 3-ethylthiophene; 3-butylthiophene; furan; 3-bromofuran; 3-iodofuran; 3-methylfuran; pyrrole; 1-ethylpyrrole; 3-propylpyrrole; pyrazole; benzofuran; benzothiophene; indole; 3-methylindole; pyran; and benzopyran.

The reaction between the heterocyclic compound reactant and the complex of anhydrous aluminum chloride and aliphatic dibasic acid anhydride reactant is carried out in the usual manner for carrying out Friedel-Crafts acylation reactions. In most halogenated paraffin solvents, the reaction takes place readily at slightly above room temperature. Preferably, the heterocyclic reactant is added portionwise, in order to avoid large temperature increases due to the exothermic reaction. In the case of some solvents, however, such as 1,1,2,2-tetrachloroethane, no reaction is evidenced at room temperature when portionwise addition of heterocyclic compound reaction is commenced. In such a case, all the heterocyclic compound reactant can be added at one time and then the reaction mixture heated to a temperature (usually 40–50° C.) at which the reaction initiates. After reaction appears to be substantially complete, as evidenced by apparent cessation of hydrogen chloride gas evolution, it is preferable to stir the reaction mixture for about one-half to three hours.

At the end of the reaction, the reaction product, heterocyclic-substituted aliphatic keto acid, is complexed with anhydrous aluminum chloride. With most halogenated paraffin solvents the product complex is dissolved in the solvent. In the case of some solvents, however, the product complex is insoluble in the solvent. Any of the usual known techniques can be used to destroy the product complex and to recover the product and the particular techniques used are not critical to this invention. For example, the complex can be destroyed by stirring with ice and hydrochloric acid.

If the complex is destroyed by stirring with ice and hydrochloric acid, the organic phase is separated from the aqueous phase. The keto acid product can be extracted from the organic phase with an aqueous solution of alkali-metal hydroxide, e.g. NaOH or KOH. The aqueous extract is then acidified to free the keto acid product which is somewhat water-soluble. Chilling or cooling the solution precipitates product, which can be recrystallized from water. Another feasible method of recovery is to steam distill off the solvent, obtaining an aqueous solution of product. The product can then be recovered by chilling and, if desired, recrystallized. It will be understood, of course, that various known manipulations can be used, such as clarification of solutions with charcoal, clay, etc. and re-extraction of solutions to obtain better recovery therefrom.

The process of this invention provides a ready means for preparing a wide variety of heterocyclic-substituted ketoaliphatic acids. These acids have a number of uses well known for ketoacids in general. For example, they can be readily converted into lactones, which can be used to modify various polymers containing acid, hydroxyl, amino, or other groups that are reactive with lactones. The lactones can graft polyester segments onto such polymers or they can be used to cross-link such polymers. The ketoacids produced in the process of this invention are also valuable chemical intermediates that after reduction can be subjected to ring closure to form hydroxyl-substituted condensed ring heterocyclic compounds. These in turn can be converted into N-alkyl or N,N-dialkyl carbamates, which have insecticidal activity. Typical carbamates of this type are the thionaphthene carbamates described in copending application Ser. No. 334,581, filed Dec. 30, 1963, which is a continuation-in-part of copending application Ser. No. 220,073, filed Aug. 28, 1962. In those applications it was disclosed that the thionaphthene ring could have various substituents, many of which can be introduced into the molecule as substituents in the starting reactants in the process of this invention, as disclosed hereinbefore. The preparation of 4-hydroxy-thionaphthene is a typical illustration of the techniques involved in effecting ring closure. The condensation product of succinic acid anhydride and thiophene, β-(α-thenoyl)-propionic acid, is first reduced to γ-(α-thienyl)-butyric acid. This is then converted by ring closure to 4-keto-4,5,6,7-tetrahydrothionaphthene, which is converted to 4-hydroxy-thionaphthene. Typical steps for this synthesis route are described by Fieser and Kennelly in J. Am. Chem. Soc., 57, 1615 (1935). The conversion to the carbamate is fully described in the aforementioned copending applications.

The following examples demonstrate the process of this invention with specific regard to the reaction of succinic acid anhydride with thiophene, using various halogenated paraffin solvents. It is to be strictly understood, however, that this invention is not to be limited by the particular reactants or to the operations and manipulations described therein. Other reactants and operations, as discussed hereinbefore, can be used, as those skilled in the art will readily appreciate.

Example 1

Succinic acid anhydride (22.0 g., 0.22 mole) was essentially dissolved (slight haze) in 440 ml. of methylene chloride (dichloromethane) at reflux temperature. The solution was then cooled to 20° C. Anhydrous aluminum chloride (58.7 g., 0.44 mole) was added rapidly with external cooling of the reaction mixture. The temperature rose to about 28° C. The reaction mixture was agitated, at room temperature, for an additional 15 minutes to obtain a smooth slurry of the succinic acid anhydride-aluminum chloride complex. Then, 16.8 g. (0.2 mole) of thiophene was added dropwise to the slurry of complex during a period of about 15 minutes. During this period the temperature rose to 30° C., hydrogen chloride was evolved at a brisk rate, and complete solution of the original slurry took place.

The reaction mixture was stirred at room temperature for 40 minutes after addition of thiophene was completed, providing a solution of reaction product complex in methylene chloride.

This solution was poured onto a mixture of 300 g. of ice and 300 ml. of concentrated hydrochloric acid. About 300 ml. of methylene chloride was added and the mixture was heated for a few minutes to completely hydrolyze product complex and to dissolve the product in methylene chloride. The organic phase was separated from the aqueous phase. The aqueous phase was extracted with additional methylene chloride (300 ml.). The organic phases were combined and extracted with a solution of 25 g. sodium hydroxide in 700 ml. of water and then with 100 ml. of water. The aqueous extracts were combined and heated (above 40° C.) to drive off any residual solvent. The aqueous phase was clarified by filtration through diatomaceous earth filter aid to remove a small amount of sludge and acidified with hydrochloric acid. The thus acidified solution was cooled and an initial crop of 33.6 g. of 3-(2-thenoyl) propionic acid was obtained. The mother liquor was extracted with 300 ml. of methylene chloride and the extract was evaporated to dryness to yield a second crop of 2.5 g. of 3-(2-thenoyl) propionic acid. The total product yield of 36.1 g. corresponds to 98.2 percent of theory.

Examples 2 through 6

A series of runs were carried out, as described in Example 1, using the same techniques, reactants, and catalyst. Instead of methylene chloride, however, a different solvent was used in each run. The pertinent data and results are set forth in the table.

TABLE

| Example | Solvent | Amount, cc. | Yield G. | Percent |
|---|---|---|---|---|
| 2 | Bromochloromethane | 400 | 36.3 | 98.7 |
| 3 | 1,2-dichloropropane | 400 | 33 | 89.7 |
| 4 | 1,2-dichloroethane | 400 | 35.2 | 95.7 |
| 5 | Dibromomethane | 400 | 36.1 | 98.2 |
| 6 | 1,2-dibromoethane | 400 | 35.4 | 96.3 |

Example 7

Succinic acid anhydride (154 g., 1.54 moles) was dissolved in 2800 ml. of 1,1,2,2-tetrachloroethane by heating at about 85° C. The solution was cooled to 8° C. and 412 g. (3.1 moles) of anhydrous aluminum chloride was added rapidly with agitation and external cooling of the reaction mixture. The temperature rose to about 10° C. Stirring and cooling were continued for 50 minutes to obtain a smooth slurry of succinic acid anhydride-aluminum chloride complex. Upon adding thiophene to this slurry no reaction was apparent at room temperature. Thus, all the thiophene (117.6 g., 1.4 moles) was added rapidly while cooling. The reaction mixture was heated quickly to 47° C., during vigorous stirring, at which temperature the reaction commenced. The exothermic reaction caused the temperature to rise to 63° C. and hydrogen chloride was evolved at a very brisk rate. After the reaction subsided, the reaction mixture was stirred at ambient temperatures for 1½ hours and then chilled in an ice bath. The reaction product complex was not soluble in the 1,1,2,2-tetrachloroethane solvent.

A mixture of 875 g. of ice and 875 ml. of concentrated hydrochloric acid was added to the reaction mixture slowly, portionwise. The resultant material was subjected to steam distillation until all the solvent was removed. The resultant aqueous solution was treated with charcoal and Hyflo-Supercel (diatomaceous silica filter aid), clarified by filtration, and chilled. A first crop of 228.9 g. of 3-(2-thenoyl) propionic acid crystallized out. The mother liquor and the charcoal-filter aid bed were extracted with diethyl ether. After evaporating the extract to dryness, there was obtained a second crop of 13.2 g. of 3-(2-thenoyl) propionic acid. The total product yield of 242.1 g. is 93.9% of theory.

From the foregoing examples, it will be apparent that the process of this invention affects the condensation of an aliphatic dibasic acid anhydride reactant with a heterocyclic compound reactant. All solvents were not equal in effectiveness, but in each case high yields were obtained. The most effective results were obtained using the dihalogenated methane solvents and these are particularly preferred solvents.

It is to be noted that, in the foregoing runs, the molar ratio of anhydrous aluminum chloride to succinic acid anhydride was 2:1, i.e., the ratio taught by the prior art to be necessary. Using the process of this invention high product yields can be obtained when using molar ratios lower than 2:1. This is demonstrated in the following examples.

Example 8

Succinic acid anhydride (22 g., 0.22 mole) was dissolved (slight haze) in 400 ml. of methylene chloride (dichloromethane) by heating at reflux temperature. The solution was cooled to 30° C. and 58.7 g. (0.44 mole) of anhydrous aluminum chloride was added, while stirring and applying external cooling to the reaction mixture. The temperature rose to 32° C. The mixture was stirred for an additional 15 minutes. Then, 16.8 g. (0.2 mole) of thiophene was added portionwise over a period of 30 minutes. After 30–45 minutes, the reaction was complete, as evidenced by cessation of the evolution of hydrogen chloride gas, affording a solution of reaction product-aluminum chloride complex.

An additional 11 g. (0.11 mole) of succinic acid anhydride was added to the solution and stirred until it reacted, giving a molar ratio of anhydrous aluminum chloride to the total amount of succinic acid anhydride of 1.33:1. Then, 10.9 g. (0.13 mole) of thiophene was added dropwise during 15 minutes. Stirring was continued until the reaction had been completed.

The resultant mixture of reaction product-aluminum chloride complex in methylene chloride was poured into dilute aqueous hydrochloric acid (600 ml.) to decompose the complex. The phases were separated and the organic layer was extracted with a dilute aqueous solution of sodium hydroxide. The basic aqueous extract was acidified and cooled to obtain a first crop of 53.6 g. of 3-(2-thenoyl) propionic acid. A second crop of 2.2 g. was recovered from the mother liquor. The total recovery of 55.8 g. corresponds to 91.9% of theory.

Example 9

Succinic acid anhydride (26.5 g., 0.265 mole) was dissolved in 520 ml. of methylene chloride by heating at reflux. The solution was then cooled to 26° C. Anhydrous aluminum chloride (58.7 g., 0.44 mole) was added with stirring and external cooling to obtain a smooth slurry of an anhydride-aluminum chloride complex. The molar ratio was 1.66:1. The solution was stirred at room temperature for 15 minutes. Then, 22.3 g. (0.265 mole) of thiophene was added portionwise over a period of 30 minutes. When reaction was complete, the product complex was decomposed and 3-(2-thenoyl) propionic acid was recovered using the procedure described in Example 8. Total recovery of product amounted to 46.7 g., i.e., 95.8% of theory.

Example 10

Following the procedure described in Example 9, a run was made using 33 g. (0.33 mole) of succinic acid anhydride, 660 ml. of methylene chloride, 58.7 g. (0.44 mole) of anhydrous aluminum chloride, and 27.7 g. (0.33 mole) of thiophene. The molar ratio of anhydrous aluminum chloride to succinic acid anhydride in this run was 1.33:1. The total recovery of 3-(2-thenoyl) propionic acid was 55.4 g., i.e., 91.2% of theory.

It will be apparent from the examples that the process of this invention provides a means of effecting the condensation reaction of aliphatic dibasic acid anhydrides with heterocyclic compounds in yields significantly higher than previously attained. Furthermore, such high yields are still achieved when the amount of anhydrous aluminum chloride used is less than that considered necessary for the reaction. In regard to using lesser amounts of anhydrous aluminum chloride, it will be noted (cf. Examples 8 and 10) that the yield is of the same magnitude regardless of whether all the dibasic acid anhydride is complexed with the anhydrous aluminum chloride or whether it is complexed serially.

In the foregoing examples, a defined halogenated paraffin solvent was used in both stages of the reaction. As discussed hereinbefore, however, such solvent need not necessarily be used in both stages, but only in the second stage. This is demonstrated in the following example.

Example 11

Succinic acid anhydride (22 g., 0.22 mole) and 200 ml. of chloroform were heated under reflux for several minutes (partial solution) and then cooled to 20° C. Anhydrous aluminum chloride (58.7 g., 0.44 mole) was added rapidly with stirring. The temperature rose to 27° C. Stirring was continued for 15 minutes. Then, 16.8 g. (0.2 mole) of thiophene dissolved in 200 ml. of dichloromethane was added dropwise. The temperature rose to 35° C. during this addition and hydrogen chloride was evolved. After stirring at ambient temperature for 45 minutes following addition of thiophene solution, the product was recovered using the procedure described in Example 1. The total recovery of 3-(2-thenoyl) propionic acid was 32.1 g., i.e., 87.2%.

As was discussed hereinbefore, the solvent used must be inert to anhydrous aluminum chloride, i.e., it must not react with the anhydrous aluminum chloride. There will be visible evidence of such reaction, such as is shown in the following example.

Example 12

Succinic acid anhydride (22 g., 0.22 mole) and 400 ml. of 1,2,3-trichloropropane were heated at 65° C. to obtain a solution of succinic acid anhydride. This was cooled to 0° C. and 58.7 g. (0.44 mole) of anhydrous aluminum chloride were added, with stirring. The solvent took on a brown coloration, evidencing a reaction of the anhydrous aluminum chloride with 1,2,3-trichloropropane, which was not evident in the runs of the preceding examples. This brown color deepened upon stirring the mixture for 15 minutes. It was attempted to react 16.8 g.

(0.2 mole) of thiophene with this deep brown mixture, but less than 30% yield of crude 3-(2-thenoyl)propionic acid having a reduced melting point was obtained. Thus, 1,2,3-trichloropropane is not a good solvent in the present process.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for effecting the reaction of a dibasic acid anhydride with a heterocyclic compound, that comprises prereacting anhydrous aluminum chloride with an aliphatic dibasic acid anhydride selected from the group consisting of succinic acid anhydride, glutaric acid anhydride, methylsuccinic acid anhydride, dimethylsuccinic acid anhydride, butenylsuccinic acid anhydride, citraconic acid anhydride, itaconic acid anhydride, glutaconic acid anhydride, chlorosuccinic acid anhydride, maleic acid anhydride, butylmaleic acid anhydride, bromomaleic acid anhydride, propenylsuccinic acid anhydride, ethylglutaric acid anhydride, and propylsuccinic acid anhydride, thereby obtaining a complex of said anhydride and anhydrous aluminum chloride; and reacting a heterocyclic compound reactant selected from the group consisting of thiophene; 2-bromothiophene; 2-chlorothiophene; 2,3-dimethylthiophene; 2,4-dimethylthiophene; 3-ethylthiophene, 3-butylthiophene; furan; 3-bromofuran; 3-iodofuran; 3-methylfuran; pyrrole; 1-ethylpyrrole; 3-propylpyrrole; pyrazole; benzofuran; benzothiophene; indole; 3-methylindole; pyran; and benzopyran with said complex in a solvent selected from the group consisting of dibromomethane, dichloromethane, bromochloromethane, and normally liquid halogenated paraffins that are inert to aluminum chloride and have the formula:

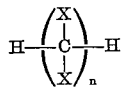

wherein $n$ is an integer from 2 to 4, X is selected from the group consisting of Cl, Br, and H, the total number of halogens is from 2 to 4, and at least two carbon atoms have halogen attached thereto.

2. The method defined in claim 1 wherein said dibasic acid anhydride is succinic acid anhydride and said heterocyclic compound reactant is thiophene.

3. The method defined in claim 2 wherein said solvent is dichloromethane.

4. The method defined in claim 2 wherein said solvent is bromochloromethane.

5. The method defined in claim 2 wherein said solvent is dibromomethane.

6. The method defined in claim 2 wherein said solvent is 1,2-dichloroethane.

7. The method defined in claim 2 wherein said solvent is 1,2-dibromoethane.

8. A method for effecting the reaction of a dibasic acid anhydride with a heterocyclic compound, that comprises prereacting anhydrous aluminum chloride with a solution of an aliphatic dibasic acid anhydride selected from the group consisting of succinic acid anhydride, glutaric acid anhydride, methylsuccinic acid anhydride, dimethylsuccinic acid anhydride, butenylsuccinic acid anhydride, citranconic acid anhydride, itaconic acid anhydride, glutaconic acid anhydride, chlorosuccinic acid anhydride, maleic acid anhydride, butylmaleic acid anhydride, bromomaleic acid anhydride, propenylsuccinic acid anhydride, ethylglutaric acid anhydride, and propylsuccinic acid anhydride in a solvent selected from the group consisting of dibromomethane, dichloromethane, bromochloromethane, and normally liquid halogenated paraffins that are inert to aluminum chloride and have the formula:

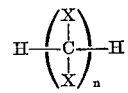

wherein $n$ is an integer from 2 to 4, X is selected from the group consisting of Cl, Br, and H, the total number of halogens is from 2 to 4, and at least two carbon atoms have halogen attached thereto, thereby obtaining a complex of said anhydride and anhydrous aluminum chloride dispersed in said solvent; and reacting a heterocyclic compound reactant selected from the group consisting of thiophene; 2-bromothiophene; 2-chlorothiophene; 2,3-dimethylthiophene; 2,4-dimethylthiophene; 3-ethylthiophene; 3-butylthiophene; furan; 3-bromofuran; 3-iodofuran; 3-methylfuran; pyrrole; 1 - ethylpyrrole; 3 - propylpyrrole; pyrazole; benzofuran; benzothiophene; indole; 3-methylindole; pyran; and benzopyran with said complex.

9. The method defined in claim 8 wherein said dibasic acid anhydride is succinic acid anhydride and said heterocyclic compound reactant is thiophene.

10. The method defined in claim 9 wherein said solvent is dichloromethane.

11. The method defined in claim 9 wherein said solvent is bromochloromethane.

12. The method defined in claim 9 wherein said solvent is dibromomethane.

13. The method defined in claim 9 wherein said solvent is 1,2-dichloroethane.

14. The method defined is claim 9 wherein said solvent is 1,2-dibromoethane.

References Cited

UNITED STATES PATENTS

| | | |
|---|---|---|
| 2,513,273 | 7/1950 | Burtner et al. _____ 260—515 |
| 2,594,355 | 4/1952 | Schwenk et al. _____ 260—344 |
| 2,654,778 | 10/1953 | Burtner _____ 260—520 |

OTHER REFERENCES

Morrison, et al., Organic Chemistry (Allyn & Bacon, Inc., Boston, 1959) pp. 840–1.

HENRY R. JILES, Primary Examiner

C. M. SHURKO, Assistant Examiner

U.S. Cl. X.R.

260—310, 326.3, 326.13, 330.5, 341.3, 345.2, 345.7, 346.2

PO-1050
(5/69)

UNITED STATES PATENT OFFICE
CERTIFICATE OF CORRECTION

Patent No. 3,465,004      Dated September 10, 1969

Inventor(s) JACK E. CRAWFORD, HAROLD M. FOSTER, & THOMAS W. HIGGINS

It is certified that error appears in the above-identified patent and that said Letters Patent are hereby corrected as shown below:

Column 1, line 46      for "anhydrous"
                               read --anhydride--

Column 2, line 45      for "after maleic acid anhydride"
                               insert --butylmaleic acid anhydride,
                                           bromomaleic acid anhydride,--

Column 8, line 29      for "signiflcantly"
                               read --significantly--

SIGNED AND
SEALED
DEC 23 1969

(SEAL)
Attest:

Edward M. Fletcher, Jr.
Attesting Officer

WILLIAM E. SCHUYLER, JR.
Commissioner of Patents